United States Patent Office.

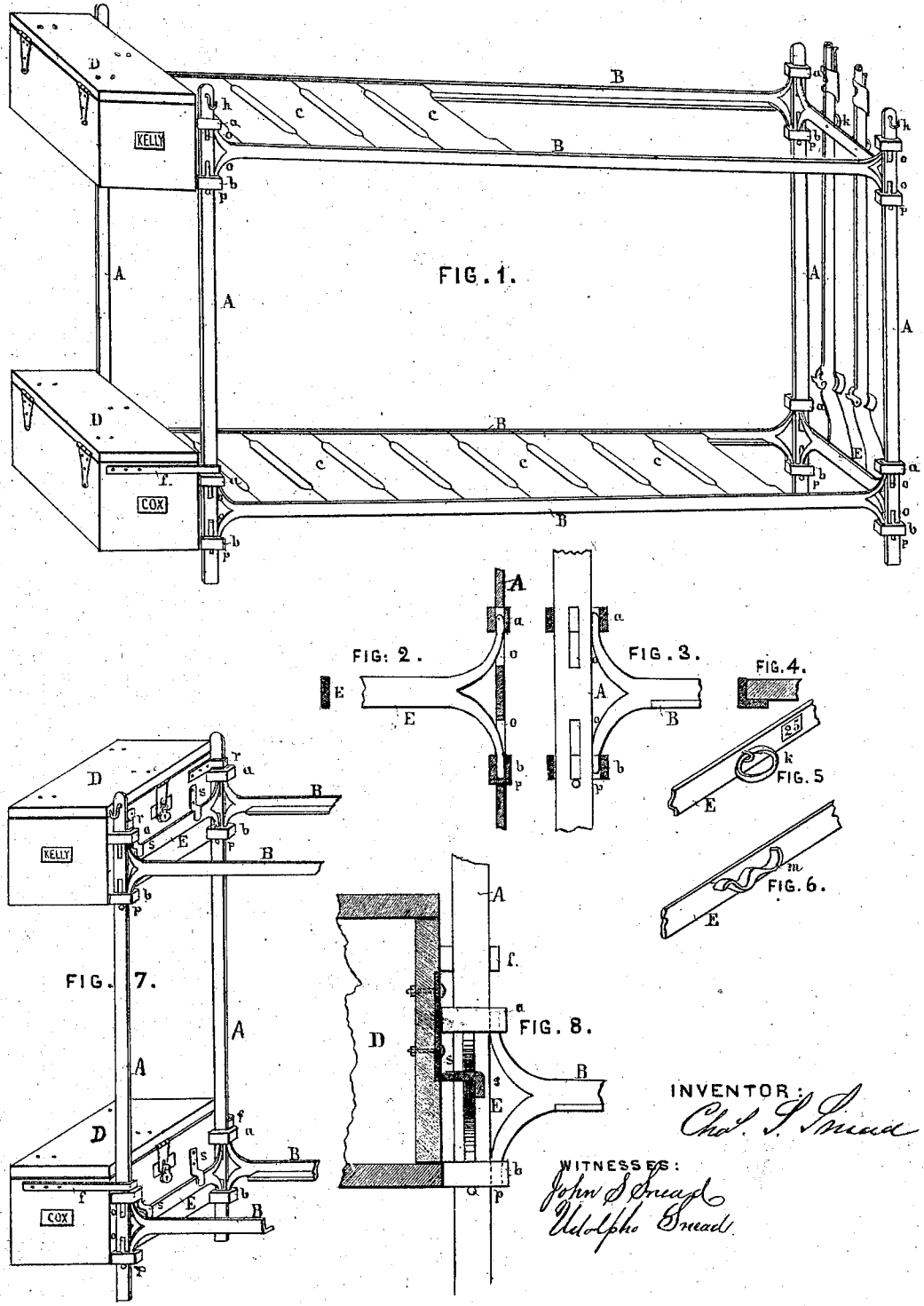

CHARLES S. SNEAD, OF LOUISVILLE, KENTUCKY.

Letters Patent No. 97,981, dated December 14, 1869.

IMPROVED BARRACK OR HOSPITAL-BEDSTEAD.

The Schedule referred to in these Letters Patent and making part of the same.

*To all whom it may concern:*

Be it known that I, CHARLES S. SNEAD, of the city of Louisville, in the county of Jefferson, in the State of Kentucky, have invented a new and useful Barrack or Hospital-Bedstead; and I do hereby declare that the following is a full, clear, and exact description of the same, reference being had to the annexed drawings, making part of this specification, in which—

Figure 1 is a perspective view of a double bedstead for barracks, showing all the parts in connection.

Figure 2 is a section, (enlarged,) showing connection of end-rail with post.

Figure 3 is a section, showing connection of side-rail with post.

Figure 4 is a section of side-rail, showing wooden slat resting on it.

Figure 5 is a part of foot-rail, showing musket-holder and slide to receive number.

Figure 6 is part of lower foot-rail, showing rest for musket.

Figure 7 is a perspective section, showing locker-attachments.

Figure 8 is a sectional view, through locker, showing hook to attach it to rail.

The bedstead consists of four upright bars A, of iron or other suitable material, of proper size and length to make a bedstead for one or more persons, fig. 1 showing double bedstead in perspective.

These bars are made of flat iron, as shown in fig. 1, with proper mortises to receive end-rails, and with loose bands, two at the bottom and two at the top of each bar or post, as shown in figs. 1 and 7, and also in enlarged sections, figs. 2, 3, and 8, *o o* being the mortises, and *a* and *b* the bands.

The side-rails are made of four pieces of angle-iron, of proper length and size, with ends forked and turned to fit in loose bands on post, and so tapered as to allow the bands to drive on tight, thereby securing the same to post in proper position, as shown in figs. 1 and 7, B, and in enlarged sections, figs. 3 and 8, *a b* showing the bands in position.

The end-rails are made of flat iron, forked and tapered in like manner as the side-rails, and are secured to post by the same bands that secure the side-rails, being properly fitted in the mortises of the post, as shown in figs. 1 and 7, and also in enlarged sections, figs. 2 and 3, *a b* showing bands, and *o o* the mortises.

The bottom is made of wooden slats, running across the bedstead, and resting on side-rails, as shown in fig. 1, and also in enlarged section, fig. 4, B showing the side-rail, and C the bottom.

The lockers D D, as shown in figs. 1 and 7, and also in enlarged section, fig. 8, are made of wood, properly ironed with hinges, lock, &c., and of sufficient length and width to receive the slats for bottom, that they may be transported therein.

These lockers are attached, the top one by a hook, on the side, and resting on the end-rail, as shown in figs. 7 and 8, S being the hook, and also by a hook, *r*, on the side of locker, as shown in fig. 7, which secures the locker to post.

The lower is attached in the same manner by hooks resting on end-rail, and also by a spring-clamp or hook on ends of locker, to attach it to post, as shown at *f*, figs. 1 and 7.

The lockers are provided with a slide to receive cards with name of occupant of bunk, as shown in figs. 1 and 7, "Cox" and "Kelly."

The foot-rail of top bunk is provided with two loops of leather, secured to rail by a rivet or screw, to allow the loop to turn freely, to facilitate the placing or removal of the musket, fig. 1 showing muskets in position, and fig. 5, K, showing loop.

The foot-rail of lower bunk is provided with rests to receive the but of muskets, so as to allow their standing in proper position securely, *m*, fig. 6, showing rest.

The foot-rails are provided with a slide to receive number, as shown in fig. 5, "25."

The posts are provided with hook at the upper end of each, for the purpose of hanging clothing on, and also to keep the loose bands from falling off, as shown in figs. 1 and 7, *h*.

The posts are also provided with pin *p*, figs. 1, 2, 3, 7, and 8, to prevent the falling off of lower loose bands, and also to hold them in their proper position.

These bedsteads can be made single or double for hospital-purposes, constructed without the musket-attachment.

What I claim as my invention, and desire to secure by Letters Patent, is—

The combination of the bands *a b*, for connecting the side and end-rails to the posts, the forked and tapered ends B and E to the side and end-rails, the clasps *s* and *r* for holding the lockers and the musket-rack, and holder K and *m*, as specified and described, for the purposes set forth.

CHAS. S. SNEAD.

Witnesses:
JOHN S. SNEAD,
UDOLPHO SNEAD.